United States Patent
Famili et al.

(10) Patent No.: US 12,510,623 B2
(45) Date of Patent: Dec. 30, 2025

(54) HIGH-ACCURACY DEVICE POSITIONING

(71) Applicant: FORD GLOBAL TECHNOLOGIES, LLC, Dearborn, MI (US)

(72) Inventors: Alireza Famili, Arlington, VA (US); Vladyslav Slyusar, Palo Alto, CA (US); Yun Ho Lee, Pleasanton, CA (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 469 days.

(21) Appl. No.: 18/188,960

(22) Filed: Mar. 23, 2023

(65) Prior Publication Data

US 2024/0329184 A1   Oct. 3, 2024

(51) Int. Cl.
*G01S 5/02*    (2010.01)
*H04B 17/318*    (2015.01)
*H04W 64/00*    (2009.01)

(52) U.S. Cl.
CPC .......... *G01S 5/0284* (2013.01); *G01S 5/0295* (2020.05); *H04B 17/318* (2015.01); *H04W 64/006* (2013.01)

(58) Field of Classification Search
CPC ....... H04W 64/00; H04W 4/029; H04W 4/33; H04W 4/023; H04W 4/02; H04W 12/79; H04W 4/026; H04W 12/63; H04W 4/025; H04W 64/003
See application file for complete search history.

(56) References Cited

U.S. PATENT DOCUMENTS

| | | | |
|---|---|---|---|
| 9,084,217 B2 | 7/2015 | Wax et al. | |
| 10,345,452 B1 * | 7/2019 | Huberman | H04W 4/024 |
| 10,422,652 B2 | 9/2019 | Kang | |
| 2003/0064735 A1 * | 4/2003 | Spain | G01S 5/02529 455/457 |

(Continued)

FOREIGN PATENT DOCUMENTS

| | | |
|---|---|---|
| KR | 20210090058 A | 7/2021 |
| WO | 2016138800 A1 | 9/2016 |

OTHER PUBLICATIONS

Khandker et al., Improving RF Fingerprinting Methods by Means of D2D Communication Protocol, Electronics 2019, vol. 8, No. 97.

*Primary Examiner* — Kwasi Karikari
(74) *Attorney, Agent, or Firm* — Joseph Zane; Brooks Kushman P.C.

(57) ABSTRACT

An ego user equipment (UE) receives absolute position and relative distance information for m other UEs at a timestamp and a fingerprint location based on signal strength information between the UE and n different femtocells. The ego UE determines, using round trip time between the ego UE and the other UEs, first distances of the ego UE from each of the other UEs. The ego UE determines, using the absolute position of the ego UE via fingerprinting information and absolute position of other UEs received through device-to-device (D2D) communication, second distances of the ego UE to each of the other UEs. The ego UE utilizes the fingerprint location as a current location of the UE responsive to a predefined threshold subset of discrepancies between the first distances and the second distances being within a predefined distance tolerance threshold.

20 Claims, 7 Drawing Sheets

(56) References Cited

U.S. PATENT DOCUMENTS

| | | | |
|---|---|---|---|
| 2013/0109405 A1* | 5/2013 | Siomina | G01S 5/017 455/456.1 |
| 2013/0337824 A1* | 12/2013 | Meredith | G01S 5/02521 455/456.1 |
| 2022/0317312 A1 | 10/2022 | Sharma et al. | |

* cited by examiner

HIGH-ACCURACY DEVICE POSITIONING

TECHNICAL FIELD

Aspects of the disclosure relate a high-accuracy positioning scheme for user equipment in indoor environments, such as where there is no usable global navigation satellite system (GNSS) signal.

BACKGROUND

Localization may be performed by absolute positioning or by relative positioning. An absolute location describes a precise point on Earth or another defined space. A relative location describes a location in relation to another familiar feature as a reference point. An example of absolute positioning is GNSS-based positioning. An example of relative positioning is finding a position of a vehicle with respect to other vehicles.

SUMMARY

In one or more illustrative examples, a method for high-accuracy positioning includes receiving, to an ego user equipment (UE), absolute position and relative distance information for m other UEs at a timestamp and a fingerprint location based on signal strength information between the UE and n different femtocells; determining, using round trip time between the ego UE and the other UEs, first distances of the ego UE from each of the other UEs; determining, using the absolute position of the ego UE via fingerprinting information and absolute position of other UEs received through device-to-device (D2D) communication, second distances of the ego UE to each of the other UEs; and utilizing the fingerprint location as a current location of the UE responsive to a predefined threshold subset of discrepancies between the first distances and the second distances being within a predefined distance tolerance threshold.

In one or more illustrative examples, system for high-accuracy positioning, includes an ego UE, configured to receive, to the ego UE, absolute position and relative distance information for m other UEs at a timestamp and a fingerprint location based on signal strength information between the UE and n different femtocells; determine, using round trip time between the ego UE and the other UEs, first distances of the ego UE from each of the other UEs; determine, using the absolute position of the ego UE via fingerprinting information and absolute position of other UEs received through D2D communication, second distances of the ego UE to each of the other UEs; and utilize the fingerprint location as a current location of the UE responsive to a predefined threshold subset of discrepancies between the first distances and the second distances being within a predefined distance tolerance threshold.

In one or more illustrative examples, a non-transitory computer-readable medium, comprising instructions for high-accuracy positioning that, when execute by an ego UE, cause the UE to perform operations for updating a previous location of the UE to a current location of the UE, including to receive, to the ego UE, absolute position and relative distance information for m other UEs at a timestamp and a fingerprint location based on signal strength information between the UE and n different femtocells; determine, using round trip time between the ego UE and the other UEs, first distances of the ego UE from each of the other UEs; determine, using the absolute position of the ego UE via fingerprinting information and absolute position of other UEs received through D2D communication, second distances of the ego UE to each of the other UEs; responsive to a predefined threshold subset of discrepancies between the first distances and the second distances being within a predefined distance tolerance threshold, utilize the fingerprint location as the current location of the UE; responsive to the predefined threshold subset of discrepancies between the second distances not being within the predefined distance tolerance threshold and the fingerprint location being within a threshold distance from the previous location of the UE, utilize the fingerprint location as the current location of the UE; responsive to the predefined threshold subset of discrepancies between the second distances not being within the predefined distance tolerance threshold and the fingerprint location not being within the threshold distance from the previous location of the UE, utilize a device-to-device (D2D) location as the current location of the UE, the D2D location being calculated based on the absolute position and the relative distance information for the other UEs; and responsive to the predefined threshold subset of discrepancies between the second distances not being within the predefined distance tolerance threshold, the fingerprint location not being within the threshold distance from a previous location of the UE, and m being less than a minimum threshold quantity of UEs, utilize the previous location of the UE as the current location of the UE.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

GNSS-based positioning may be used to obtain the absolute location of a target. If GNSS is unavailable, ranging-based positioning (e.g., using 802.11 aka WiFi routers or cellular infrastructure) may provide an absolute position of a target so long as the absolute locations of the anchor points (routers or base stations) are known. In outdoor environments where there is limited access to navigation satellites (e.g., crowded urban areas with skyscrapers), or in indoor spaces where usually there is no access to the navigation satellites, relative positioning may still be achieved (using techniques such as vision/sensor-based positioning), where the relative position is converted to absolute coordinates as an offset from a fixed point (e.g., from a WiFi or cellular access point (AP)). Since there is usually no WiFi network in an outdoor environment, unless high-power outdoor WiFi access points with high transmission power outdoors, positioning using cellular network is one technique that can operate as a substitute GNSS-based positioning for both indoor and outdoor environments.

Unlike WiFi, which lacks outdoor infrastructure, for cellular-based positioning base stations have been deployed to cover many locations. As compared to GNSS, the achievable positioning accuracy is worse when using 4G LTE. Additionally, for indoor environments, there may be lack of cellular signals with adequate strength (e.g., underground parking lots).

5G new radio (NR) solves some of these issues as compared to 4G LTE. In terms of accuracy, the large bandwidth available both in the FR1 (sub 6 GHz) and FR2 (mmWave) along with other capabilities increase the accuracy of the positioning to bring it to GNSS-based accuracy or better. For indoor environments where there is no cellular signal, it is possible to install a 5G base femtocell or picocell base stations (e.g., 5G DOTs). Femto base stations may be installed in an area of interest (AOI) to augment 5G communications, resolving reduced signal reception that may occur in some indoor environments. As used herein, femtocell is understood to mean femtocell cellular base-stations, but could also apply to any other appropriate basestation, such as other types of small cell, i.e. picocell, microcell, or any other type of cellular base station.

There are several mechanisms that may be employed in 5G to accomplish positioning. In an example, time of flight (TOF) may measure the signal between the 5G station and the UE. Other approaches include measuring the time difference of arrival (TDOA), or angle of arrival (AOA), or received signal strength (RSS). Among these available techniques, RSS has the lowest computational burden, most straightforward algorithm, and the most minimal additional hardware requirements. There are various techniques to derive distances which later translate to position from RSS, such as using a path-loss formula and fingerprinting technique. Comparably, the RSS fingerprints of the 5G signals may be a suitable choice for deriving distances.

Newer cellular technologies than LTE, such as 5G NR technology, may be used for positioning using 5G signal fingerprints and 5G side-link D2D communication (e.g., vehicle-to-vehicle (V2V) communications). A vehicle with an unknown location may find its position based on the 5G RSS fingerprints, where this data may be collected in an offline phase and stored in the location server (LS). In an online phase, a vehicle with an unknown location measures the RSS of a downlink signal from 5G femtocells installed in an AOI and sends the measured RSS values to the LS. In the LS, based on the available map which has been made in the off-line phase, a matching algorithm may be applied to attribute a group of RSS values from different femtocells to a position.

Yet, such fingerprinting techniques are vulnerable to the online changes in the environment that have not been seen in the off-line map, which may degrade the positioning accuracy. To address this, the D2D information may be leveraged to complement 5G fingerprints and provide reliable high-accuracy positioning even in presence of changes in the environment. Further aspects of the cooperative positioning scheme based on 5G fingerprinting assisted by 5G D2D communications are discussed in detail herein.

Figure 1A:
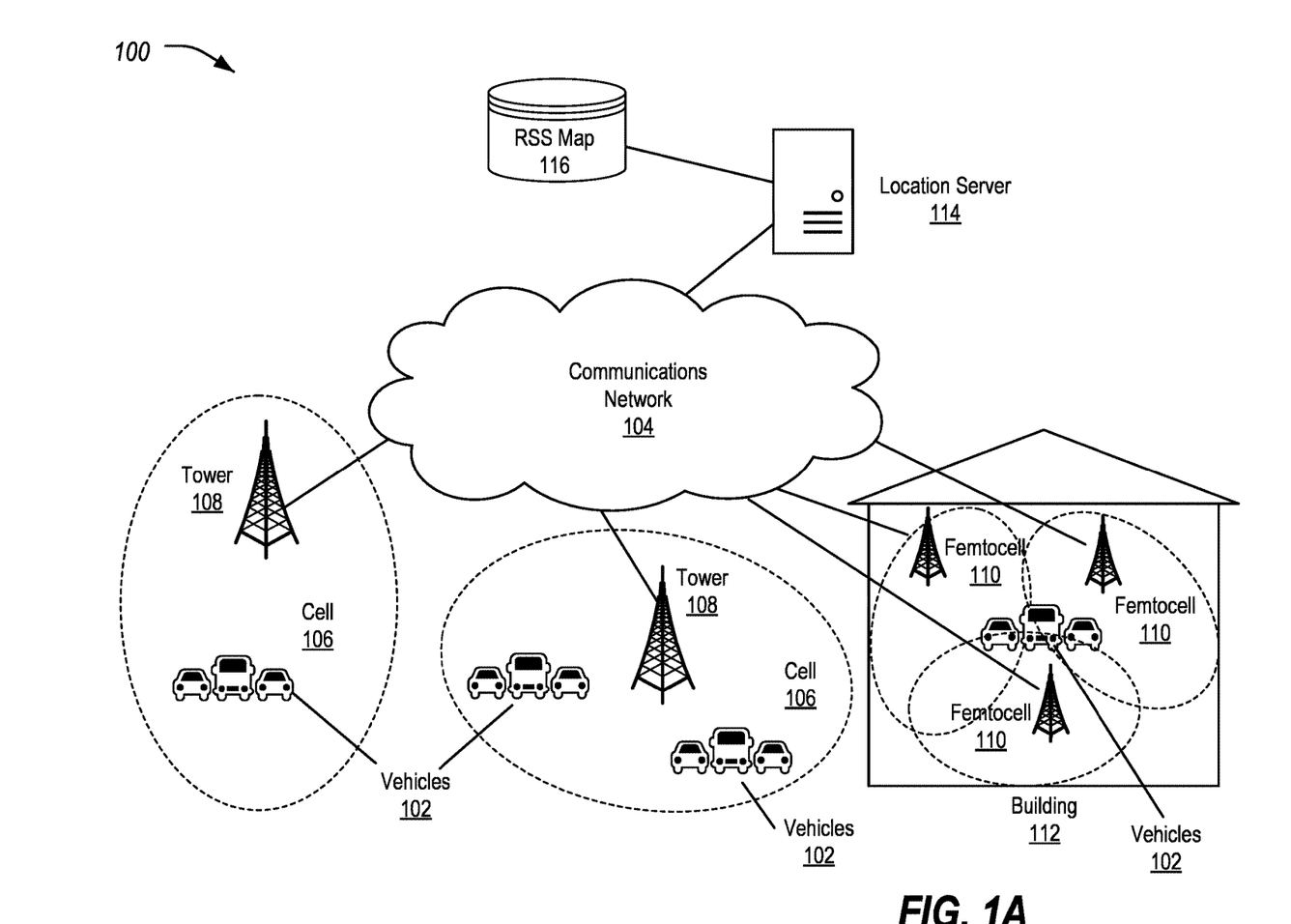
FIG. 1A illustrates an example system implementing a high-accuracy positioning scheme usable for vehicles.

FIG. 1A illustrates an example system 100 implementing a high-accuracy positioning scheme for vehicles 102. The system 100 may include one or more vehicles 102 configured to provide data over a communications network 104. The communications network 104 may include various cells 106 outside of buildings 112 and femtocells 110 within buildings 112. A location server 114 may be located in the communications network 104. The location server 114 may be configured to maintain an RSS map 116. It should be noted that the system 100 is an example, and systems 100 including more, fewer, and differently located vehicles 102, cells 106, femtocells 110, and buildings 112 may be utilized.

The vehicle 102 may include various types of automobile, crossover utility vehicle (CUV), sport utility vehicle (SUV), truck, recreational vehicle (RV), boat, plane or other mobile machine for transporting people or goods. Such vehicles 102 may be human-driven or autonomous. In many cases, the vehicle 102 may be powered by an internal combustion engine. As another possibility, the vehicle 102 may be a battery electric vehicle (BEV) powered by one or more electric motors. As a further possibility, the vehicle 102 may be a hybrid electric vehicle (HEV) powered by both an internal combustion engine and one or more electric motors, such as a series hybrid electric vehicle, a parallel hybrid electrical vehicle, or a parallel/series hybrid electric vehicle. Alternatively, the vehicle 102 may be an autonomous vehicle (AV). The level of automation may vary between variant levels of driver assistance technology to a fully automatic, driverless vehicle. As the type and configuration of vehicle 102 may vary, the capabilities of the vehicle 102 may correspondingly vary. As some other possibilities, vehicles 102 may have different capabilities with respect to passenger capacity, towing ability and capacity, and storage volume. For title, inventory, and other purposes, vehicles 102 may be associated with unique identifiers, such as vehicle identification numbers (VINs).

The vehicle 102 may include network hardware configured to facilitate communication between the vehicle and other devices of the system 100. For example, the vehicle 102 may include or otherwise access a cellular modem configured to facilitate communication with a communications network 104. This hardware may be referred to herein as UE. The communications network 104 may include one or more interconnected communication networks such as the Internet, a cable television distribution network, a satellite link network, a local area network, and a telephone network, as some non-limiting examples. As another example, the vehicle 102 may utilize one or more of BLUETOOTH, ultra wideband (UWB), Wi-Fi, or universal serial bus (USB) network connectivity to facilitate communication with the communications network 104 via a user's mobile device. Further aspects of the operation of vehicles 102 are discussed with respect to FIG. 2.

The communications network 104 may include a plurality of cells 106. Each cell 106 may be served by one or more cellular towers 108 and may have capacity limits based on the physical capacity of the one or more cellular towers 108 and/or the geography of the physical area of the cell 106. The vehicles 102 may communicate over the communications network 104 with via connection to the cellular towers 108 of the cells 106 of the communications network 104.

The communications network 104 may further include a plurality of femtocells 110. Moreover, for indoor environments such as buildings 112 where there is no cellular signal, it is femtocell 110 base stations may be installed in the building 112 to provide 5G communications, to address the reduced signal reception in the indoor environment.

The location server 114 may be an example of one or more networked computing devices that are accessible to the vehicle 102 over the communications network 104. The UE onboard the vehicles 102 may receive 5G DL signals from different femtocells 110 installed in the AOI. The femtocells 110 may have been installed for communication purposes and may be utilized for positioning without deploying additional hardware. Responsive to measuring the RSS values from different DL signals, the UE of the vehicles 102 may transmit these measured values back to the femtocells 110. These RSS values may be sent from the femtocells 110 to the LS 114. An RSS map 116 of the measured RSS values, along with the corresponding position of the vehicles 102, may be stored by the LS 114. Using the RSS map 116 and a matching algorithm, an estimate of the position of the UE may be provided and transmitted back to the UE through the femtocells 110.

Figure 1B:
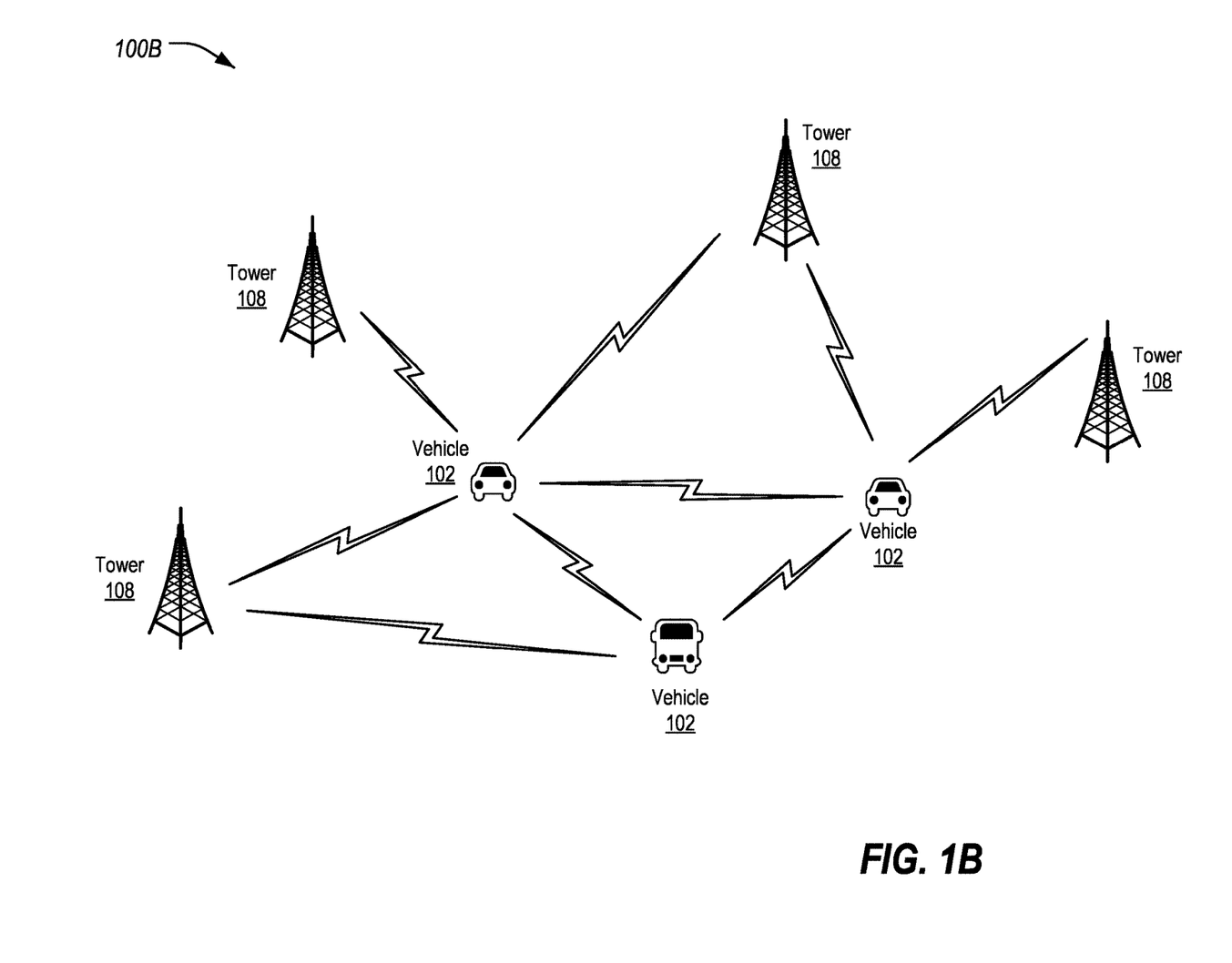
FIG. 1B illustrates an example of cooperative positioning where all the vehicles in the communications network have access to a plurality of the reference cellular towers.

FIG. 1B illustrates an example 100B of cooperative positioning where all the vehicles 102 in the communications network 104 have access to a plurality of the reference cellular towers 108. In such an example 100B, the information received from the other cellular towers 108 may allow the vehicles 102 to cooperatively increase the final accuracy of their determined location.

Figure 1C:
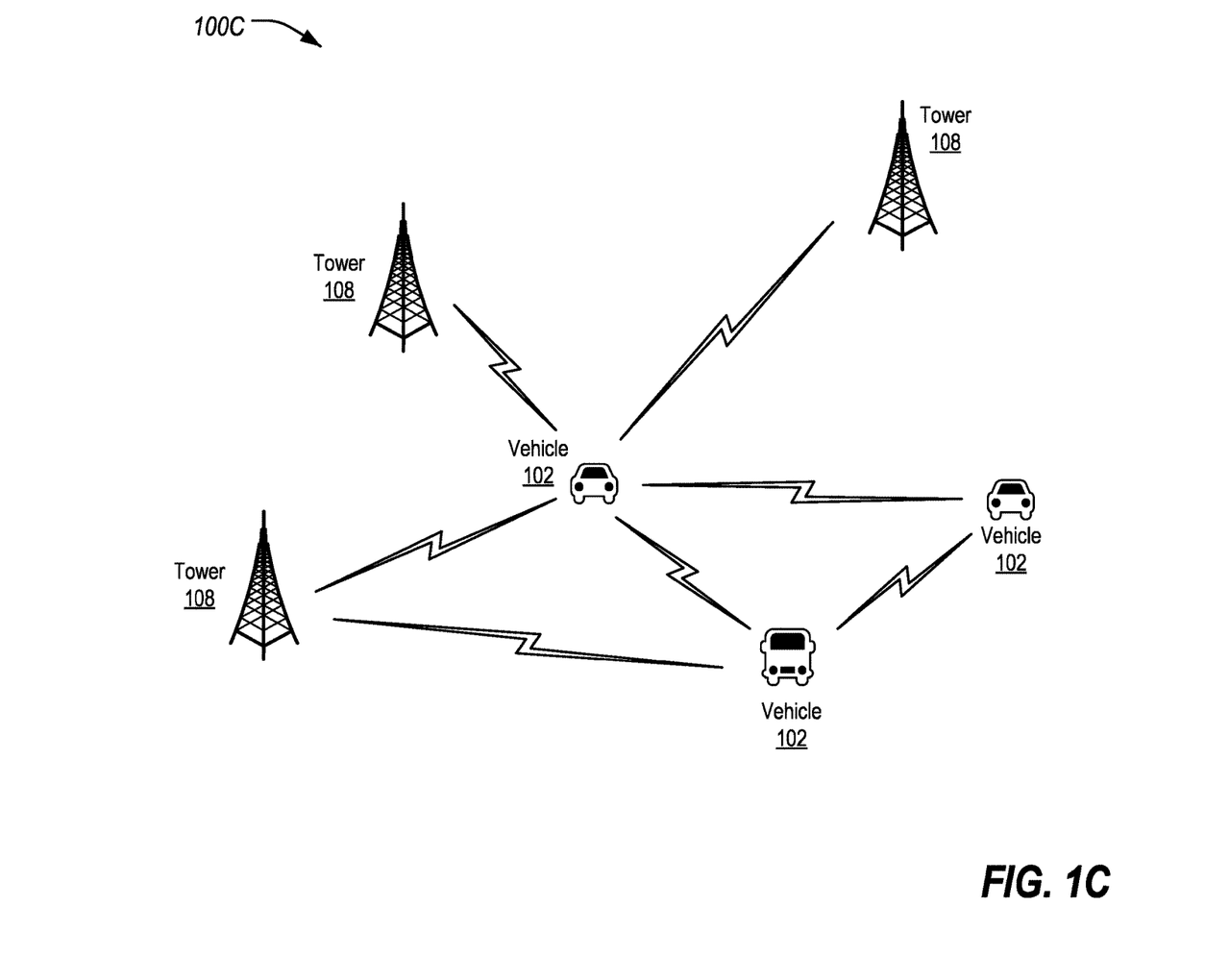
FIG. 1C illustrates an example of cooperative positioning where some of the vehicles in the communications network lack access to the cellular towers.

FIG. 1C illustrates an example 100C of cooperative positioning where some of the vehicles 102 in the communications network 104 lack access to the cellular towers 108. In such an example 100C, the vehicles 102 lacking access to the cellular towers 108 may cooperate to leverage communication between different vehicles 102 for localization.

It can be shown mathematically that the cooperative localization increases the accuracy as compared to a single localization. For instance, it can be shown that the cooperative localization affects the Cramer Rao lower bound (CRLB) of the position estimator. The CRLB is a lower bound on the variance of an unbiased estimator (here, the position estimator). The relation may be as shown in equation (1):

$$J(\eta) = J_{ref} + J_{coop} - C \quad (1)$$

Where:
- $J(\eta)$ is the final fisher information matrix (FIM);
- $J_{ref}$ is the FIM block diagram from references;
- $J_{coop}$ is the FIM block diagram from other vehicles 102; and
- C is the reduction of the information since other vehicles 102 have unknown positions.

The CRLB is in relation with the inverse of the FIM and shows that the cooperative helps to prevent the FIM from becoming singular.

5G fingerprinting may be assisted by D2D cooperative communications for high-accuracy vehicle 102 positioning in confined indoor spaces such as buildings 112. A 5G received signal strength (RSS) fingerprinting technique for vehicular absolute positioning in the indoor environment may be used. In some examples, the RSS fingerprinting may optionally be augmented with machine learning (ML). As discussed, fingerprinting techniques are highly vulnerable to real-time changes. To address this, the 5G D2D communication link may be used to detect real-time changes and provide the accurate location information for various scenarios with respect to possible real-time environmental changes.

At each time stamp, the UE onboard the vehicle 102 may obtains RSS from downlink signal of n different femtocells 110. These signal strength measurements may be referred to as $$(RF_1^{(t)}, RF_2^{(t)}, \ldots, RF_n^{(t)}).$$

Also at each timestamp, the UE may receive the absolute position and relative distance of m other vehicles 102 to the UE $((p_1, d_1), (p_2, d_2), \ldots, (p_m, d_m))$. Each of the vehicles 102 may also have their absolute position determined using the same algorithm.

To obtain the relative distance, a round trip time (RTT) protocol for 5G signal may be deployed. RTT for 5G is similar to the fine timing measurement (FTM) protocol for WiFi technology. Briefly, the UE sends a 5G signal to the vehicle 102 to which it intends to find the distance, then that vehicle 102 sends a signal back to the UE. Because UE records the time stamp at which it transmits the signal, and since the waiting time (in the other vehicle 102 before sending the signal back to the UE) is predefined and available to the UE, after measuring the time of arrival (TOA) of the returned signal, the UE may measure the distance between itself and the other vehicle 102 using the following formula:

$$d = \frac{(t_4 - t_1) - (t_3 - t_2)}{2} \times c; \quad (2)$$

Where:
- $t_1$ is the time stamp that the UE sends the first signal;
- $t_2$ is the time stamp at which the remote vehicle 102 receives the signal;
- $t_3$ is the time stamp at which the remote vehicle 102 sends the return signal back to the UE;
- $t_3$ is the time stamp at which the UE received the signal back from the remote vehicle 102; and
- c is the speed of light.

Thus, the remote vehicle 102 waits for $(t_3 - t_2)$ and send a signal back to the UE at $t_3$, while the UE receives the signal at $t_4$. Also, the UE receives at each time stamp the final position estimation of itself at the previous time stamp, which is $$P_{final}^{(t-1)}.$$

Accordingly, the tuple $$\{RF_i, (p_i, d_i), P_{final}^{(t-1)}\}$$

may be the information that the UE receives at each time stamp, where and $$P_{final}^{(t-1)}$$

is the final position estimation of the UE at time stamp (t−1).

Figure 2:
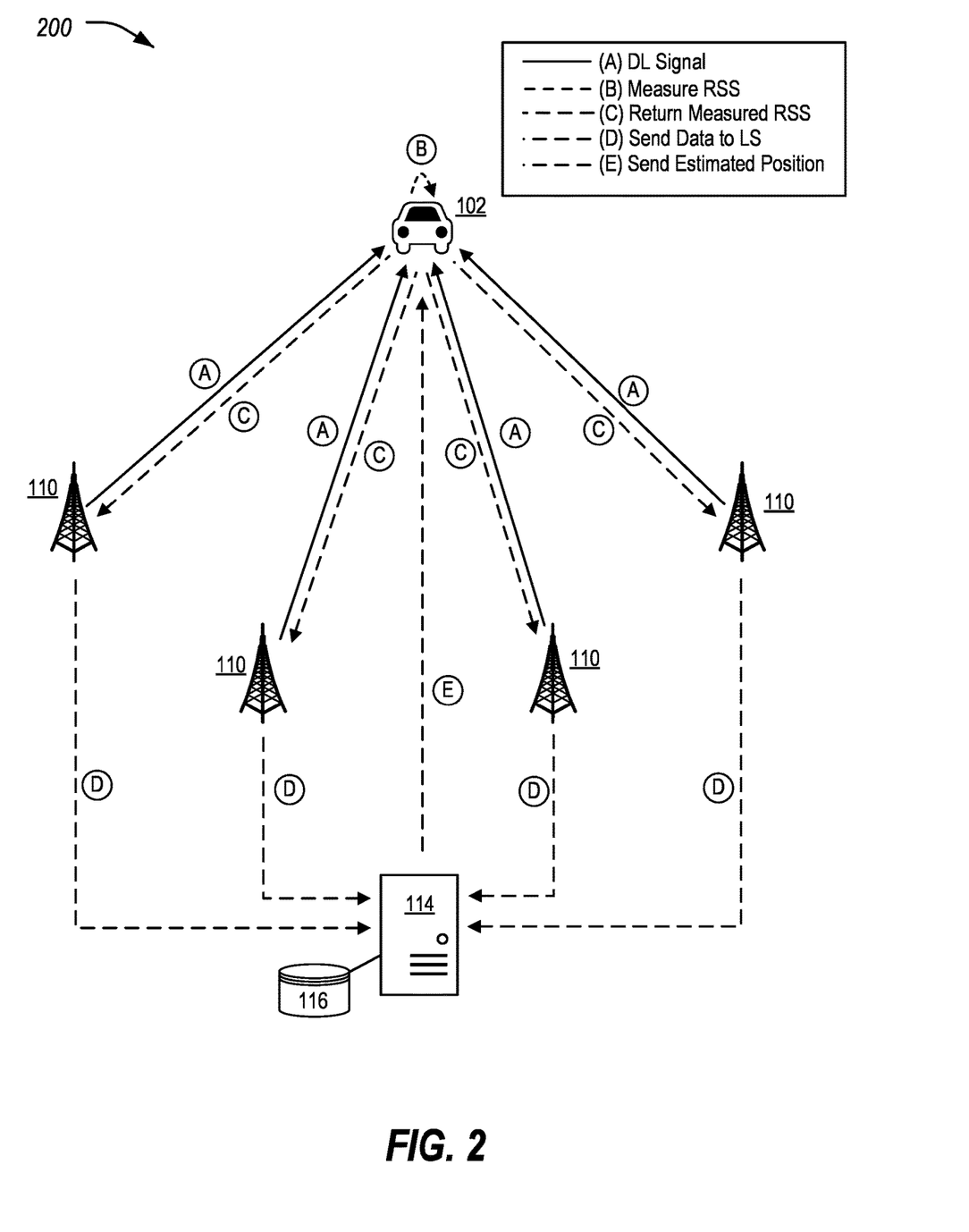
FIG. 2 illustrates a graphical representation of a first step position estimation based on 5G downlink (DL) signals fingerprinting.

FIG. 2 illustrates a graphical representation 200 of position estimation based on 5G DL signals fingerprinting. This first step includes to check if the information received from the n femtocells 110 is adequate for the UE to find its location using fingerprinting. This position may be referred to as $$P_{FP}^{(t)}.$$

As shown, at index (A), the UE onboard the vehicle 102 receives 5G DL signals from different femtocells 110 installed in the AOI. At index (B), the vehicle 102 measures the RSS using the DL signals. At index (C), the vehicle 102 returns the measured RSS to the femtocells 110. At index (D), the femtocells 110 send the measured RSS to the LS 114. At index (E), the LS 114 computed the estimated position of the vehicle 102 and sends that position to the vehicle 102.

The UE may measure the distance between itself and the other m vehicles 102 using the following equation:

$$\left\| P_{FP}^{(t)} - p_i \right\| \quad (3)$$

Where:

$p_i$ is the absolute position of the $i^{th}$ vehicle 102; and $\|\cdot\|$ is the Euclidean distance.

These distances may be referred to as $dd_i$.

Figure 3:
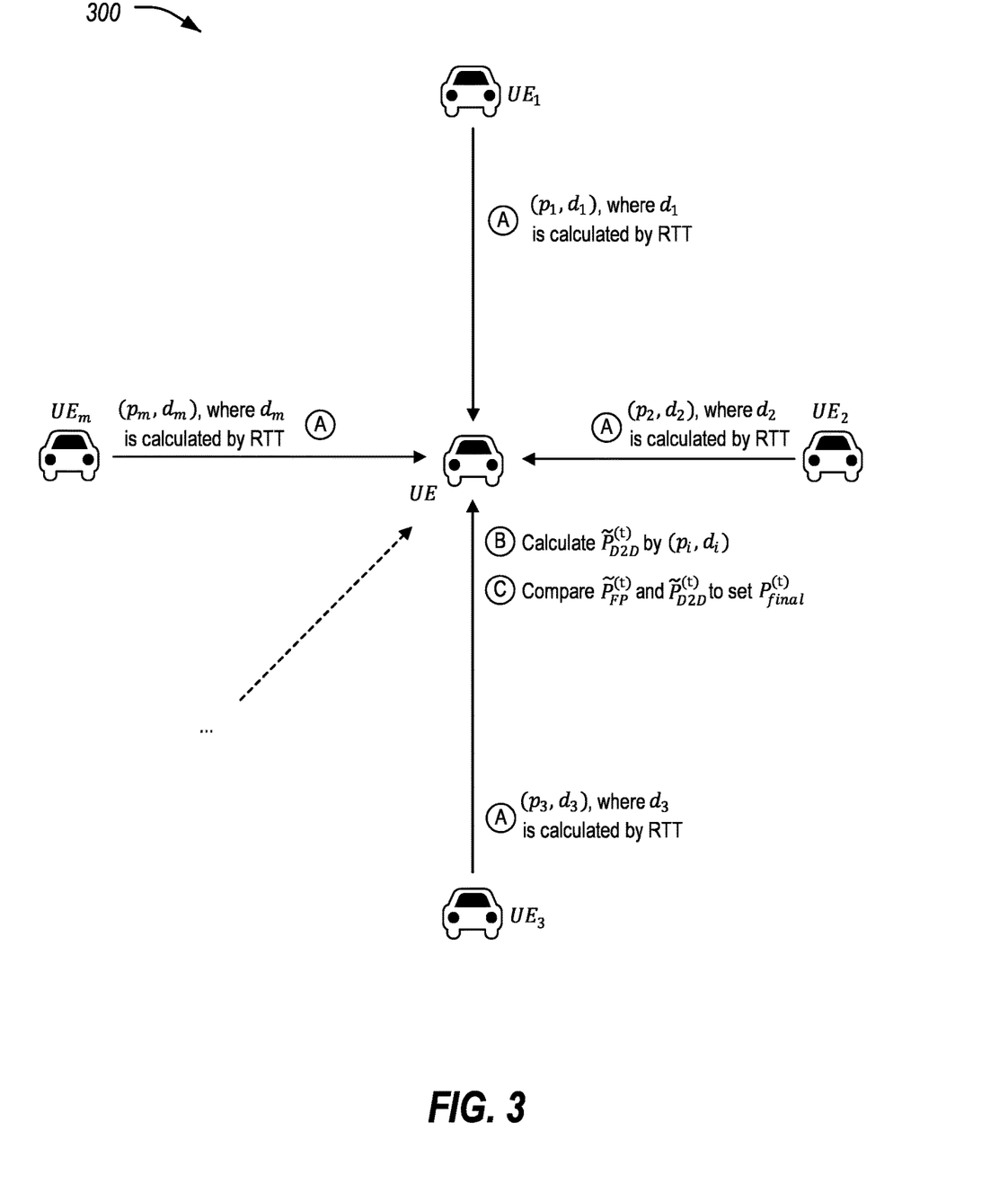
FIG. 3 illustrates a graphical representation of the D2D positioning and how to use the results in relation to the steps in FIG. 2 to find the final position.

FIG. 3 illustrates a graphical representation 300 of the D2D positioning and how to use the results in relation to the steps in FIG. 2 to find the final position. As shown, at index (A), each of the $UE_1$ through $UE_m$ sends their respective position $p_i$ and distance $d_i$ information to the ego UE. At index (B), the UE estimates $$P_{D2D}^{(t)}.$$

using the position $p_i$ and distance $d_i$ information. At index (C), the UE compares $$P_{FP}^{(t)} \text{ with } P_{D2D}^{(t)} \text{ and sets } P_{final}^{(t)}$$

as discussed in detail herein.

In this second step, the UE checks whether these $dd_i$ distances are similar to the $d_i$ distances calculated using the RTT protocol. This comparison test may be conducted by:

$$|d_i - dd_i| > \epsilon_d \quad (4)$$

Where:

$\epsilon_d$ is a predefined tolerance threshold for the difference in distances.

If at least a threshold amount of the distances are similar, such as a majority of the distances, then the fingerprinting results may be considered to be correct. In such an instance, the $$P_{FP}^{(t)}$$

may be reported as the final position.

But, if too many of the $dd_i$ distances are different from the corresponding $d_i$ distances, then the $$P_{FP}^{(t)}$$

from the fingerprinting may not be reliable. If so, the positioning may be found using the $((p_1, d_1), (p_2, d_2), \ldots, (p_m, d_m))$ information. Then, this position information and $$P_{FP}^{(t)}$$

may be compared with $$P_{final}^{(t-1)}.$$

Whichever of the positions that is closer to the $$P_{final}^{(t-1)}$$

may be represented as the final $$P_{final}^{(t)}.$$

The other positions may be identified as being incorrect. The reason for the incorrect location may be investigated, and/or the other vehicles 102 may be informed to prevent the other vehicles 102 from relying on the incorrect positional information in the short term.

If the amount of information to draw a position is insufficient or if neither of the final positions are close enough to $$P_{final}^{(t-1)},$$

then the UE may identify that, for this specific time stamp, there is no final accurate position. If so, the UE may instead try to find a position based on the $$P_{final}^{(t-1)}$$

and available information such as position based on the inertial measurement unit (IMU) information $$P_{IMU}^{(t-1)}.$$

The UE may report this as the final $$P^{(t)}_{final}$$

for that time stamp. Although such a worst-case scenario may be rare, the algorithm accounts for the possibility as well.

Figure 4:
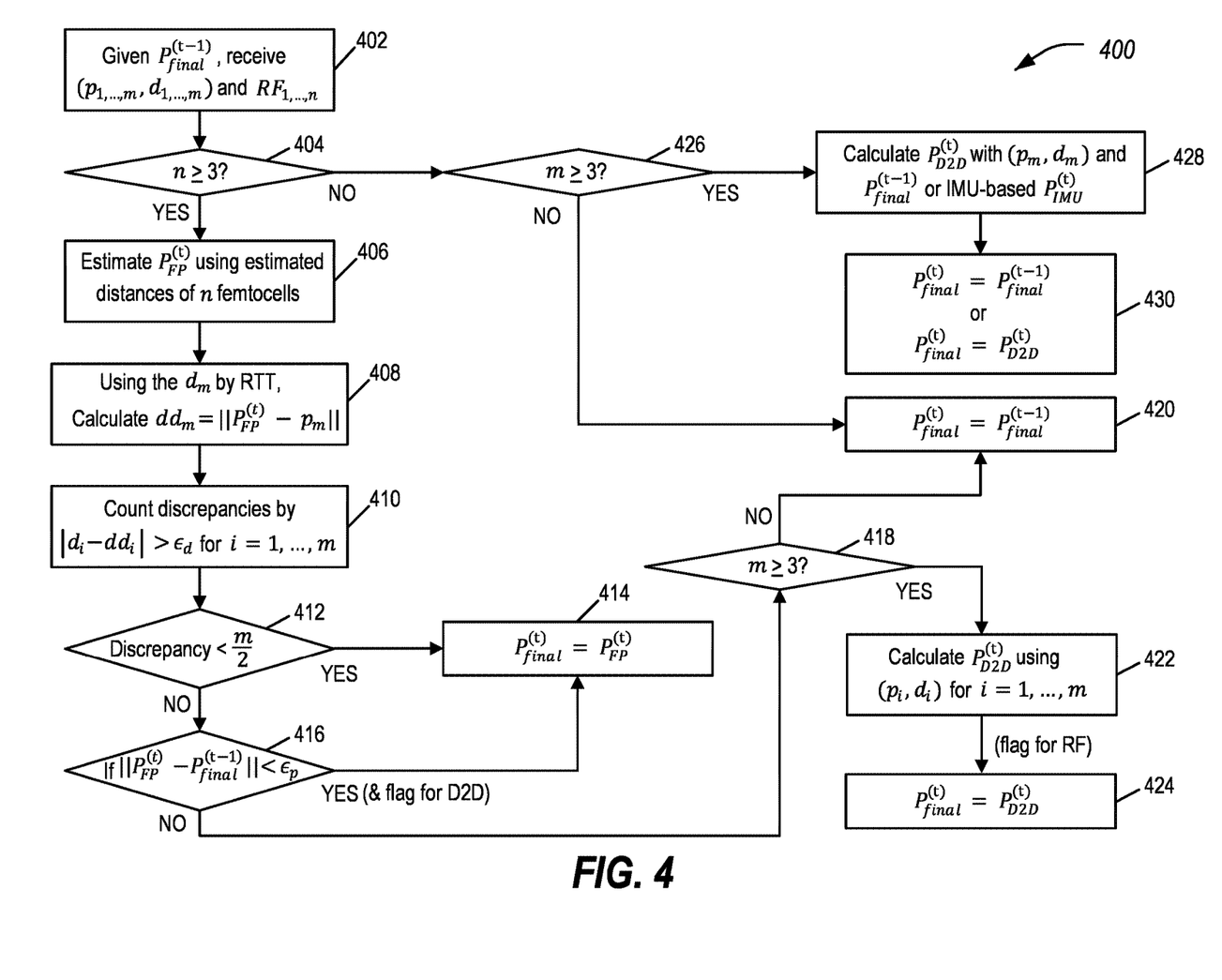
FIG. 4 illustrates an example process for the operation of the UE to determine the final position estimate for the vehicle.

FIG. 4 illustrates an example process 400 for the operation of the UE to determine the final position estimate for the vehicle 102. In an example, the process 400 may be performed by the UE of the vehicle 102, in the context of the system 100. In general, the input to the process 400 is the 5G received power at time t from n different femtocells 110, e.g., $$(RF^{(t)}_1, RF^{(t)}_2, \ldots, RF^{(t)}_n),$$

the absolute position and relative distance of m other vehicles 102, e.g., $((p_1, d_1), (p_2, d_2), \ldots, (p_m, d_m))$, and a final position estimation of the vehicle 102 itself at (t−1), which may be referred to as $$P^{(t-1)}_{final}.$$

The output of the process 400 is the final position estimation at t which may be referred to as $$P^{(t)}_{final}.$$

At operation 402, given $$P^{(t-1)}_{final},$$

the vehicle 102 receives the 5G received power at time t from n different femtocells 110, e.g., $$(RF^{(t)}_1, RF^{(t)}_2, \ldots, RF^{(t)}_n),$$

and the absolute position and relative distance of m other vehicles 102, e.g., $((p_1, d_1), (p_2, d_2), \ldots, (p_m, d_m))$.

At operation 404, the vehicle 102 determines whether the number of femtocells 110, n, exceeds a predefined minimum threshold. In the illustrated example, this threshold is three due to the fact that for two-dimensional localization three reference points are required, but different thresholds could conceivably be used. If so, control proceeds to operation 406.

At operation 406, the vehicle 102 estimates $$P^{(t)}_{FP}$$

using the estimated distances from the n femtocells 110. Using fingerprinting, the vehicle 102 finds the position at time (t) which is $$P^{(t)}_{FP}.$$

Further aspects of the position estimation based on 5G DL signals fingerprinting are discussed above, such as with respect to the graphical representation 200 shown in FIG. 2.

At operation 408, the vehicle 102 uses the relative distance $d_m$ to each of the m other vehicles 102 for computing the distance between $$P^{(t)}_{FP}$$

and each of the absolute positions $p_1, p_2, \ldots, p_m$ of the m other vehicles 102. In an example, the vehicle 102 may compute the distance between itself and the other m vehicles 102 using equation (3) as discussed above. These distances may be referred to as $dd_i$, and may include $dd_1, dd_2, \ldots, dd_m$ corresponding to each of the $p_1, p_2, \ldots, p_m$.

At operation 410, the vehicle 102 counts the discrepancies between the distances $d_1, d_2, \ldots, d_m$ to the $dd_1, dd_2, \ldots, dd_m$ that are greater than the predefined tolerance threshold for the difference in distances $\epsilon_d$.

At operation 412, the vehicle 102 determines whether the count of the discrepancies determined at operation 410 is greater than $$\left[\frac{m}{2}\right].$$

If the majority of the distances are similar, then the fingerprinting results may be considered to be correct. In such an instance, control proceeds to operation 414, where the $$P^{(t)}_{FP}$$

is reported as the final position. After operation 414, the process 400 ends.

On the other hand, if the majority of $dd_i$ distances are different from the corresponding $d_i$ distances, then the $$P^{(t)}_{FP}$$

from the fingerprinting may not be considered to be reliable. If the majority of the distances are not similar, control instead passes from operation 412 to operation 416.

At operation 416, the vehicle 102 determines if the previous position is within a predefined tolerance threshold Ep from the current fingerprinting position $$P^{(t)}_{FP}.$$

This may be computed, for example, as $$\left\| P^{(t)}_{FP} - P^{(t-1)}_{final} \right\| < \epsilon_p.$$

If so, control again proceeds to operation 414, where the $$P_{FP}^{(t)}$$

is reported as the final position. In some examples, any incorrect locations may be flagged for investigation, and/or the other vehicles 102 may be informed to prevent the other vehicles 102 from relying on the incorrect positional information in the short term. Aspects of this determination are discussed above with respect to the graphical representation 300 of the D2D positioning shown in FIG. 3.

On the other hand, if $$P_{FP}^{(t)}$$

is outside the predefined tolerance threshold Ep, control proceeds to operation 418. At operation 418, the vehicle 102 determines whether the number of vehicles 102, m, exceeds a predefined minimum threshold. In the illustrated example, this threshold is three, but different thresholds could conceivably be used. If not, and there are fewer than the threshold of vehicles 102, control proceeds to operation 420, where $$P_{final}^{(t-1)}$$

is reported as the final position. This may be done, for example, as there is insufficient information to rely on for an updated position. After operation 420, the process 400 ends.

If there are at least the threshold quantity of vehicles 102, control proceeds to operation 422. At operation 422, the vehicle 102 calculates $$P_{D2D}^{(t)}$$

using the relative distances $d_1, d_2, \ldots, d_m$ and the absolute positions $p_1, p_2, \ldots, p_m$ of the of m other vehicles 102. This may be performed for each of the vehicles 102, i.e., for $i=1, \ldots, m$. Aspects of this determination are also discussed above with respect to the graphical representation 300 of the D2D positioning shown in FIG. 3. At operation 424, the vehicle 102 reports $$P_{D2D}^{(t)} \text{ as the } P_{final}^{(t)}$$

position. After operation 424, the process 400 ends.

Returning back to operation 404, if the number of femtocells 110, n, does not exceed the predefined minimum threshold, control passes to operation 426. At operation 426, the vehicle 102 determines whether the number of vehicles 102, m, exceeds a predefined minimum threshold. In the illustrated example, this threshold is three, but different thresholds could conceivably be used. If not, and there are fewer than the threshold number of vehicles 102, control proceeds to operation 420, where $$P_{final}^{(t-1)}$$

is reported as the final position.

If, at operation 426, there are at least the predefined minimum threshold number of vehicles 102, control proceeds to operation 428. At operation 428, the vehicle 102 attempts to find the final position based on the previous time $$P_{final}^{(t-1)},$$

based on a combination of available radio frequency (RF) and the D2D, or based on IMU data. For instance, the vehicle 102 may calculate $$P_{D2D}^{(t)}$$

using the relative distances $d_1, d_2, \ldots, d_m$ and the absolute positions $p_1, p_2, \ldots, p_m$ of the of m other vehicles 102. In another example, the vehicle 102 may utilize IMU information to estimate a location of the vehicle 102 based on the previous vehicle 102 location (t−1) and dead reckoning.

At operation 430, a final position of the vehicle 102 is determined. For example, this may be $$P_{D2D}^{(t)} \text{ or } P_{final}^{(t-1)}.$$

In another example, this may b $$P_{D2D}^{(t)} \text{ or } P_{final}^{(t-1)}$$

as updated based on the IMU information. In yet another example, this may be an average of $$P_{D2D}^{(t)} \text{ or } P_{final}^{(t-1)}$$

as updated based on the IMU information as $$P_{IMU}^{(t)}.$$

Regardless of the approach, this position may be utilized as $$P_{final}^{(t)}.$$

After operation 430, the process 400 ends.

In pseudocode form, an algorithm for the collaboration of 5G RSS fingerprinting and D2D cooperative positioning is shown as follow:

Input: 5G Received power at time t from n different femtocells $(RF_1^{(t)}, RF_2^{(t)}, \ldots, RF_n^{(t)})$, Absolute position and relative distance of m other vehicles $((p_1, d_1), (p_2, d_2), \cdots, (p_m, d_m))$, Final position estimation of itself at $(t-1)$ which is $P_{final}^{(t-1)}$.

Output: Final position estimation at t of $P_{final}^{(t)}$.

1: if $n \geq 3$ then

2:    Using fingerprinting, find the position at time (t) as $P_{FP}^{(t)}$;

3:    Calculate the distance between $P_{FP}^{(t)}$ and each of $p_1, p_2, \ldots, p_m$ as $dd_1, dd_2, \ldots, dd_m$;

4:    for i = 1 : 1 : m do
5:       if $|d_i - dd_i| > \epsilon_d$ then
6:          discrepancy = discrepancy + 1;
7:       end if
8:    end for 9:    if discrepancy $< \left[\frac{m}{2}\right]$ then 10:       $P_{final}^{(t)} = P_{FP}^{(t)}$;

11:    end if

12:    if discrepancy $\geq \left[\frac{m}{2}\right]$ then

13:       if $\|P_{FP}^{(t)} - P_{final}^{(t-1)}\| < \epsilon_p$ then 14:          $P_{final}^{(t)} = P_{FP}^{(t)}$;

15:          potentially flag D2D results; broadcast to other participants;
16:       end if 17:       if $\|P_{FP}^{(t)} - P_{final}^{(t-1)}\| \geq \epsilon_p$ then 18:          if $m \geq 3$ then 19:             estimate position using $((p_1, d_1), (p_2, d_2), \ldots, (p_m, d_m))$ as $P_{D2D}^{(t)}$;

20:             if $\|P_{D2D}^{(t)} - P_{final}^{(t-1)}\| < \epsilon_p$ then 21:                $P_{final}^{(t)} = P_{D2D}^{(t)}$;

22                potentially flag RF results; flag fingerprints; broadcast to other participants;
23             else
24                flag = true;
25:             end if
26          else
27             flag = true;
28:          end if
29:       end if
30:    end if
31: else
32:    flag = true;
33: end if
34: if flag

| | |
|---|---|
| 35: | attempt positioning based on $P^{(t-1)}_{final}$, available RF and/or D2D, or via data as $P^{(t)}_{IMU}$; |
| 36: | end if |

Thus, a cooperative positioning scheme based on 5G fingerprinting assisted by 5G D2D communications may be performed. As discussed above, the D2D information may be leveraged to complement 5G fingerprints and provide reliable high accuracy positioning even in presence of real-time changes in the environment.

Figure 5:
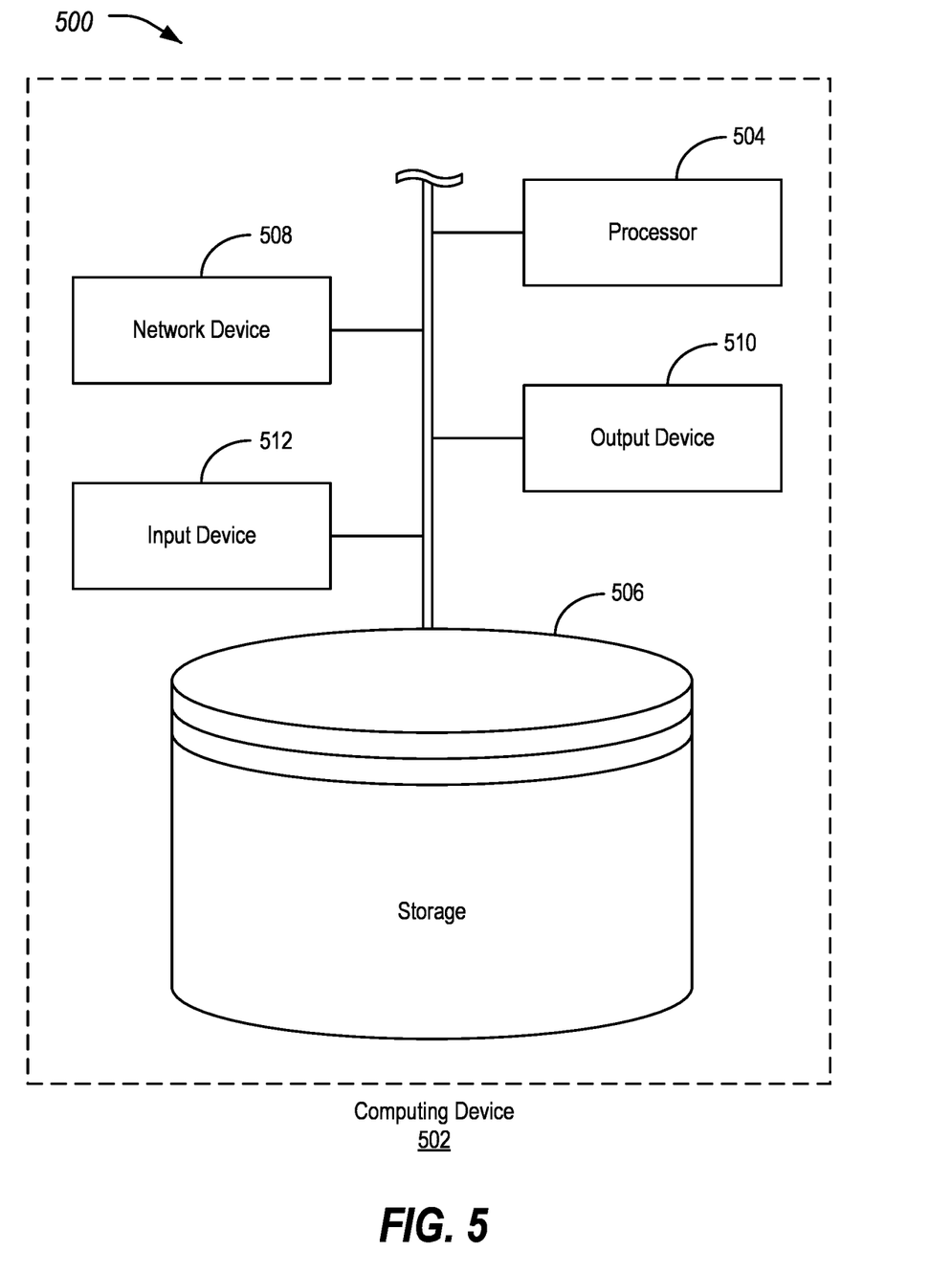
FIG. 5 illustrates an example of a computing device for use in implementing a high-accuracy positioning scheme for vehicles.

FIG. 5 illustrates an example 500 of a computing device 502 for use in implementing a high-accuracy positioning scheme for vehicles 102. Referring to FIG. 5, and with reference to FIGS. 1A-4, the vehicles 102, communications network 104, cellular tower 108, femtocells 110, and LS 114 may be examples of such computing devices 502. As shown, the computing device 502 includes a processor 504 that is operatively connected to a storage 506, a network device 508, an output device 55, and an input device 512. It should be noted that this is merely an example, and computing devices 502 with more, fewer, or different components may be used.

The processor 504 may include one or more integrated circuits that implement the functionality of a central processing unit (CPU) and/or graphics processing unit (GPU). In some examples, the processors 504 are a system on a chip (SoC) that integrates the functionality of the CPU and GPU. The SoC may optionally include other components such as, for example, the storage 506 and the network device 508 into a single integrated device. In other examples, the CPU and GPU are connected to each other via a peripheral connection device such as peripheral component interconnect (PCI) express or another suitable peripheral data connection. In one example, the CPU is a commercially available central processing device that implements an instruction set such as one of the x86, ARM, Power, or microprocessor without interlocked pipeline stage (MIPS) instruction set families.

Regardless of the specifics, during operation the processor 504 executes stored program instructions that are retrieved from the storage 506. The stored program instructions, accordingly, include software that controls the operation of the processors 504 to perform the operations described herein. The storage 506 may include both non-volatile memory and volatile memory devices. The non-volatile memory includes solid-state memories, such as not and (NAND) flash memory, magnetic and optical storage media, or any other suitable data storage device that retains data when the system is deactivated or loses electrical power. The volatile memory includes static and dynamic random-access memory (RAM) that stores program instructions and data during operation of the system 50.

The GPU may include hardware and software for display of at least two-dimensional (2D) and optionally 3D graphics to the output device 55. The output device 55 may include a graphical or visual display device, such as an electronic display screen, projector, printer, or any other suitable device that reproduces a graphical display. As another example, the output device 55 may include an audio device, such as a loudspeaker or headphone. As yet a further example, the output device 55 may include a tactile device, such as a mechanically raiseable device that may, in an example, be configured to display braille or another physical output that may be touched to provide information to a user.

The input device 512 may include any of various devices that enable the computing device 502 to receive control input from users. Examples of suitable input devices that receive human interface inputs may include keyboards, mice, trackballs, touchscreens, voice input devices, graphics tablets, and the like.

The network devices 508 may each include any of various devices that enable the vehicles 102 and LS 114 to send and/or receive data from external devices over the communications network 104. Examples of network devices 508 include an Ethernet interface, a Wi-Fi transceiver, a cellular transceiver, or a BLUETOOTH or BLUETOOTH low energy (BLE) transceiver, UWB transceiver, or other network adapter or peripheral interconnection device that receives data from another computer or external data storage device, which can be useful for receiving large sets of data in an efficient manner.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as read-only memory (ROM) devices and information alterably stored on writeable storage media such as floppy disks, magnetic tapes, compact discs (CDs), RAM devices, and other magnetic and optical media. The processes, methods, or algorithms can also be implemented in a software executable object. Alternatively, the processes, methods, or algorithms can be embodied in whole or in part using suitable hardware components, such as application specific integrated circuit (ASIC), field-programmable gate array (FPGA), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, life cycle, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for high-accuracy positioning, comprising:
receiving, to an ego user equipment (UE), absolute position and relative distance information from m other UEs at a timestamp and a fingerprint location based on signal strength information between the UE and n different femtocells;
determining, using round trip time between the ego UE and the other UEs, first distances of the ego UE from each of the other UEs;
determining, using the absolute position of the ego UE via fingerprinting information and absolute position of other UEs received through device-to-device (D2D) communication, second distances of the ego UE to each of the other UEs; and
utilizing the fingerprint location as a current location of the UE responsive to a predefined threshold subset of discrepancies between the first distances and the second distances being within a predefined distance tolerance threshold.

2. The method of claim 1, further comprising, responsive to the predefined threshold subset of discrepancies between the second distances not being within the predefined distance tolerance threshold:
utilizing the fingerprint location as the current location of the UE responsive to the fingerprint location being within a threshold distance from a previous location of the UE.

3. The method of claim 2, wherein utilizing the fingerprint location as the current location of the UE further comprises flagging the absolute position and the relative distance information as being inaccurate.

4. The method of claim 1, further comprising, responsive to the predefined threshold subset of discrepancies between the second distances not being within the predefined distance tolerance threshold and the fingerprint location not being within a threshold distance from a previous location of the UE:
calculating a D2D location of the UE based on the absolute position and the relative distance information for the other UEs; and
utilizing the D2D location as the current location of the UE.

5. The method of claim 4, wherein utilizing the D2D location as the current location of the UE further comprises flagging the signal strength information as being inaccurate.

6. The method of claim 1, further comprising, responsive to the predefined threshold subset of discrepancies between the second distances not being within the predefined distance tolerance threshold, the fingerprint location not being within a threshold distance from a previous location of the UE, and m being less than a minimum threshold quantity of UEs:
utilizing the previous location of the UE as the current location of the UE.

7. The method of claim 1, wherein the predefined threshold subset of discrepancies is m/2.

8. The method of claim 1, further comprising responsive to m being at least a minimum threshold quantity of UEs and n being less than a minimum threshold quantity of femtocells:
utilizing, as the current location of the UE, a device-to-device (D2D) location of the UE based on the absolute position and the relative distance information for the other UEs, or
utilizing, as the current location of the UE, a previous location of the UE updated using dead reckoning based on inertial measurement unit (IMU) data.

9. The method of claim 1, further comprising responsive to m being less than a minimum threshold quantity of UEs and n being less than a minimum threshold quantity of femtocells:
utilizing a previous location of the UE as the current location.

10. A system for high-accuracy positioning, comprising:
an ego user equipment (UE), configured to:
receive, to the ego user equipment (UE), absolute position and relative distance information for m other UEs at a timestamp and a fingerprint location based on signal strength information between the UE and n different femtocells;
determine, using round trip time between the ego UE and the other UEs, first distances of the ego UE from each of the other UEs;
determine, using the absolute position of the ego UE via fingerprinting information and absolute position of other UEs received through device-to-device (D2D) communication, second distances of the ego UE to each of the other UEs; and
utilize the fingerprint location as a current location of the UE responsive to a predefined threshold subset of discrepancies between the first distances and the second distances being within a predefined distance tolerance threshold.

11. The system of claim 10, wherein the ego UE is further configured to, responsive to the predefined threshold subset of discrepancies between the second distances not being within the predefined distance tolerance threshold:
utilize the fingerprint location as the current location of the UE responsive to the fingerprint location being within a threshold distance from a previous location of the UE.

12. The system of claim 11, wherein to utilize the fingerprint location as the current location of the UE further comprises to flag the absolute position and the relative distance information as being inaccurate.

13. The system of claim 10, wherein the ego UE is further configured to, responsive to the predefined threshold subset of discrepancies between the second distances not being within the predefined distance tolerance threshold and the fingerprint location not being within a threshold distance from a previous location of the UE:
calculate a device-to-device (D2D) location of the UE based on the absolute position and the relative distance information for the other UEs; and
utilize the D2D location as the current location of the UE.

14. The system of claim 13, wherein to utilize the D2D location as the current location of the UE further comprises to flag the signal strength information as being inaccurate.

15. The system of claim 10, wherein the ego UE is further configured to, responsive to the predefined threshold subset of discrepancies between the second distances not being within the predefined distance tolerance threshold, the fingerprint location not being within a threshold distance from a previous location of the UE, and m being less than a minimum threshold quantity of UEs:
  utilize the previous location of the UE as the current location of the UE.

16. The system of claim 10, wherein the predefined threshold subset of discrepancies is m/2.

17. The system of claim 10, wherein the ego UE is further configured to responsive to m being at least a minimum threshold quantity of UEs and n being less than a minimum threshold quantity of femtocells, one or more of:
  utilize, as the current location of the UE, a device-to-device (D2D) location of the UE based on the absolute position and the relative distance information for the other UEs, or
  utilize, as the current location of the UE, a previous location of the UE updated using dead reckoning based on inertial measurement unit (IMU) data.

18. The system of claim 10, wherein the ego UE is further configured to responsive to m being less than a minimum threshold quantity of UEs and n being less than a minimum threshold quantity of femtocells:
  utilize a previous location of the UE as the current location.

19. A non-transitory computer-readable medium, comprising instructions for high-accuracy positioning that, when execute by an ego UE, cause the UE to perform operations for updating a previous location of the UE to a current location of the UE, including to:
  receive, to the ego user equipment (UE), absolute position and relative distance information for m other UEs at a timestamp and a fingerprint location based on signal strength information between the UE and n different femtocells;
  determine, using round trip time between the ego UE and the other UEs, first distances of the ego UE from each of the other UEs;
  determine, using the absolute position of the ego UE via fingerprinting information and absolute position of other UEs received through device-to-device (D2D) communication, second distances of the ego UE to each of the other UEs;
  responsive to a predefined threshold subset of discrepancies between the first distances and the second distances being within a predefined distance tolerance threshold, utilize the fingerprint location as the current location of the UE;
  responsive to the predefined threshold subset of discrepancies between the second distances not being within the predefined distance tolerance threshold and the fingerprint location being within a threshold distance from the previous location of the UE, utilize the fingerprint location as the current location of the UE;
  responsive to the predefined threshold subset of discrepancies between the second distances not being within the predefined distance tolerance threshold and the fingerprint location not being within the threshold distance from the previous location of the UE, utilize a D2D location as the current location of the UE, the D2D location being calculated based on the absolute position and the relative distance information for the other UEs; and
  responsive to the predefined threshold subset of discrepancies between the second distances not being within the predefined distance tolerance threshold, the fingerprint location not being within the threshold distance from a previous location of the UE, and m being less than a minimum threshold quantity of UEs, utilize the previous location of the UE as the current location of the UE.

20. The non-transitory computer-readable medium of claim 19, wherein the UE is integrated into a vehicle.

* * * * *